(12) United States Patent
Vought

(10) Patent No.: US 6,497,294 B2
(45) Date of Patent: Dec. 24, 2002

(54) SOIL CONDITIONER IMPLEMENT

(75) Inventor: Michael L. Vought, Grove City, MN (US)

(73) Assignee: Clark Equipment Company, Woodcliff Lake, NJ (US)

( * ) Notice: Subject to any disclaimer, the term of this patent is extended or adjusted under 35 U.S.C. 154(b) by 36 days.

(21) Appl. No.: 09/729,036

(22) Filed: Dec. 4, 2000

(65) Prior Publication Data

US 2001/0027869 A1 Oct. 11, 2001

Related U.S. Application Data

(63) Continuation-in-part of application No. 09/379,539, filed on Aug. 24, 1999, now abandoned.
(60) Provisional application No. 60/232,470, filed on Sep. 13, 2000.

(51) Int. Cl.$^7$ ................................................. H01B 33/00
(52) U.S. Cl. ...................... 172/122; 172/123; 172/537; 172/554
(58) Field of Search ............................ 172/123, 122, 172/518, 537, 539, 540, 551, 554

(56) References Cited

U.S. PATENT DOCUMENTS

| | | |
|---|---|---|
| 315,184 A | 4/1885 | Taft |
| 523,134 A | 7/1894 | Sullivan |
| 1,366,068 A | 1/1921 | Doane |
| 1,402,586 A | 1/1922 | Erwin |
| 1,497,855 A | 6/1924 | Joneson |
| 1,568,439 A | 1/1926 | Baxter |
| 2,222,840 A | 11/1940 | Holmes |
| 2,410,003 A | 10/1946 | Bagan |
| 2,652,673 A | 9/1953 | Zehren |
| 2,781,623 A | 2/1957 | Anderson |
| 2,787,876 A | 4/1957 | Cole |

(List continued on next page.)

FOREIGN PATENT DOCUMENTS

| | | |
|---|---|---|
| CA | 1048791 | 2/1979 |
| DE | 250363 | 8/1912 |
| GB | 472443 | 9/1937 |

OTHER PUBLICATIONS

BleCavator 2–page brochure, Date unknown.
Dairon 2–page brochure, Date unknown.

*Primary Examiner*—Christopher J. Novosad
(74) *Attorney, Agent, or Firm*—Michael Best & Friedrich LLP

(57) ABSTRACT

A soil conditioner implement designed for operation in cooperation with a supporting skid steer vehicle, the skid steer vehicle being moveable over the soil to be conditioned and having a source of hydraulic fluid under pressure for transmission to the soil conditioner implement for powering thereof and having a skid steer control system for providing a plurality of commands to the soil conditioner implement, the soil conditioner implement includes a drum member having a rotatable drum, the drum being selectively contactable with the soil to be conditioned. A bolster member is operably coupled to the drum member for supporting in part the drum member, the bolster member being shiftable between a soil engaging disposition and a flipped-up disposition, the bolster member being borne on the drum member when in the flipped-up disposition. A method of conditioning soil is further included.

65 Claims, 8 Drawing Sheets

U.S. PATENT DOCUMENTS

| | | |
|---|---|---|
| 2,886,114 A | 5/1959 | Peterson |
| 2,941,606 A | 6/1960 | Gillette |
| 2,959,201 A | 11/1960 | Tourneau |
| 2,971,587 A | 2/1961 | Anderson |
| 3,117,631 A | 1/1964 | Fahrenholz |
| 3,224,347 A | 12/1965 | Seaman |
| 3,324,955 A | 6/1967 | Perold |
| 3,332,222 A | 7/1967 | Heinlein |
| 3,366,081 A | 1/1968 | Geiss |
| 3,463,548 A | 8/1969 | Kelly |
| 3,465,456 A | 9/1969 | Meyer |
| 3,479,755 A | 11/1969 | Schropp |
| 3,703,210 A | 11/1972 | Williams |
| 3,739,855 A | 6/1973 | Bliss |
| 3,901,169 A | 8/1975 | Ribouleau |
| 3,923,101 A | 12/1975 | Donohue |
| 3,970,012 A | 7/1976 | Jones |
| 3,993,141 A | 11/1976 | Donohue |
| 4,015,411 A | 4/1977 | van der Lely |
| 4,040,490 A | 8/1977 | Anderson |
| 4,149,364 A | 4/1979 | Aron |
| 4,199,030 A | 4/1980 | Chance |
| 4,202,160 A | 5/1980 | van der Lely |
| 4,221,265 A | 9/1980 | Pratt |
| 4,315,546 A | 2/1982 | Fahrenholz |
| 4,440,235 A | 4/1984 | Colistro |
| 4,496,003 A | 1/1985 | Bynum |
| 4,516,639 A | 5/1985 | Hammarlund |
| 4,555,897 A | 12/1985 | Degelman |
| 4,593,426 A | 6/1986 | Chrisley |
| 4,768,333 A | 9/1988 | Reber |
| 4,785,614 A | 11/1988 | Schoenherr |
| 4,811,442 A | 3/1989 | Barker |
| 4,878,713 A | 11/1989 | Zanetis |
| 4,895,476 A | 1/1990 | Vangaever |
| 5,024,280 A | 6/1991 | Mork |
| 5,060,732 A | 10/1991 | Baskett |
| 5,070,946 A | 12/1991 | Herr |
| 5,092,409 A | 3/1992 | Defrancq |
| 5,133,413 A | 7/1992 | Baxter |
| 5,261,218 A | 11/1993 | Jones |
| 5,437,333 A | 8/1995 | McPherson |
| 5,450,907 A | 9/1995 | McPherson |
| D364,174 S | 11/1995 | McPherson |
| 5,505,268 A | 4/1996 | McPherson |
| 5,540,040 A | 7/1996 | Peeters |
| 5,598,691 A | 2/1997 | Peeters |

SOIL CONDITIONER IMPLEMENT

RELATED APPLICATIONS

The present application claims the benefit of U.S. Provisional Application No. 60/232,470 filed Sep. 13, 2000, and is a continuation-in-part application of U.S. patent application Ser. No. 09/379,539 filed Aug. 24, 1999, now abandoned, both of the aforementioned applications being incorporated herein by reference in their entirety.

TECHNICAL FIELD

The present invention relates to rotary drum soil conditioners. More particularly, the present invention relates to an improved soil conditioner that may be used in conjunction with a skid-steer utility vehicle.

BACKGROUND OF THE INVENTION

Preparing land for construction of buildings, parking lots, and golf courses often involves extracting rocks and other debris from an upper portion of the soil profile and may involve generally planing the prepared soil profile as well. A number of implements have been prepared for those purposes.

U.S. Pat. No. 4,315,546, issued to Fahrenholz Feb. 16, 1982, discloses a double roll rock windrower. The rock windrower of Fahrenholz includes a main roller and an auxiliary roller. The main roller is moved along the ground and is rotationally driven under power. The roller is disposed at an oblique angle with respect to the direction of travel, so that dislodged rocks are moved axially along the roller and laterally to the direction of movement, until the rocks are discharged at the trailing end of the roll in a windrow. The auxiliary roller is mounted above the main roller and spaced apart from the main roller. The auxiliary roller is unpowered. The auxiliary roller acts to prevent rocks from spilling over the main roller, thus making it possible to form larger windrows, while permitting dirt clods and some foreign material to pass between the main and auxiliary rollers. The auxiliary roller is mounted on arms which are pivotally mounted relative to the mounting for the main roller, thereby permitting the second roller to be spaced as desired relative to the main roller.

U.S. Pat. No. 4,516,639, issued to Hammarlund et al., May 14, 1985, discloses a powered landscape rake for fine grading of a landscape surface, as well as stone and debris removal therefrom. The rake is mounted to a tractor and includes a drum rotatably mounted on a drum frame. The drum frame, in turn, is mounted to a turntable assembly for allowing the drum frame to pivot about an axis generally perpendicular to the drum frame and which is located generally midway of the drum frame. A frame member is attached to the turntable and extends to a point under the tractor frame in front of the tractor front wheels. The free end of the frame member is mounted to pivot and swivel on a frame attachment member. First and second cylinders are further attached to the turntable for positioning the drum frame at any desired angle in a vertical plane to the landscape and to allow the drum frame to sway in a horizontal plane about the front frame attachment point. The drum can be rotated in either direction by a hydraulic motor. The hydraulic motor and drum provide a kicking-type action to the soil of the landscape surface to further provide a smooth, fine, finished grade for seeding and covering seed.

U.S. Pat. No. 5,060,732, issued to Baskett Oct. 29, 1991, discloses a cylinder-type, ground-raking attachment for a bucket-equipped tractor. The ground-raking attachment includes a tubed, cylindrical rotor. The cylindrical rotor works the soil and simultaneously rakes the ground free of rocks, refuse, roots, sticks, and other debris which is then transferred to the tractor bucket by action of the rotor.

U.S. Pat. No. 5,261,218, issued to Jones et al., Nov. 16, 1993, discloses a powered rake having a debris windrowing mechanism. The powered rake includes a main frame for coupling to a tractor, a subframe mounted for pivotal movement relative to the main frame about an upright pivot axis, a roller pivotal with the subframe at an oblique angle relative to the direction of travel, and a material control member including a blade extending along the length of the roller and presenting a gap therebetween. The subframe is preferably pivotal for presenting the roller at an oblique angle to the right or left with respect to the intended direction of travel, thereby permitting the powered rake to continuously windrow the debris in the path of the roller. The roller is rotatably mounted on a pair of downwardly and forwardly extending legs which present substantially open areas outboard the roller. These substantially open areas permit debris to pass freely outboard into a windrow without obstruction from the frame or subframe. The roller preferably presents a plurality of circumferentially spaced, radially projecting splines. The splines are spirally oriented about the longitudinal axis of the roller to present an even load on the roller as the roller rotates in engagement with the soil.

U.S. Pat. No. 5,505,268, issued to McPherson et al., Apr. 9, 1996, discloses a bi-directional field implement for preparing a field. The bi-directional field implement includes a ground-engaging device which allows the implement to be pushed or pulled on the field. The ground-engaging device includes a reversible roller with projections joined to an outer surface thereof to engage the ground. The projections do not extend along the complete length of the roller, but rather only a portion thereof. The implement includes reversible/removable guards for keeping the disturbed soil in front of the roller when the guards are positioned to extend in the direction of travel of the vehicle to which the implement is attached. Such guards must be manually repositioned based on the expected direction of travel.

While some or all of these implements extract and windrow rocks and other debris and plane the profile of the soil being prepared, there is a need for an implement which is mountable to a prime mover such as a skid steer type vehicle, which will extract and windrow debris from the soil profile, which will generally plane or level the soil profile as well, and which operates when being either pushed or towed. Further, there is a need for an implement in which the profiling device is moveable proximate fixed objects, such as a tree or a building to effect a desired ground profile immediately adjacent to the object. Additionally, the implement should occupy minimal space on a transport vehicle when the implement is being transported between sites. The device should be simple to construct and maintain.

SUMMARY OF THE INVENTION

The following features comprise at last some of the novel features and improvements of the soil conditioner of the present invention.

1. Flip-up bolster member. The flip-up bolster member provides for unlocking the bolster member from its normal position with the caster wheels engaged with the ground and supporting the bolster member above the drum. In such disposition, the drum is the leading element of the soil conditioner. This allows the operator to work much closer to walls and other obstructions. Additionally, the soil conditioner may be operated in a reverse direction leaving no wheel traces on the ground to present a more attractive appearance of the conditioned soil. Further, with the bolster member in the flipped-up disposition, the transportation length of the soil conditioning implement and its supporting skid steer vehicle is substantially reduced. This is an important consideration as the soil conditioner implement and skid steer vehicle are frequently trailered from job site to job site on limited length trailers.

2. Oscillating bolster. The bolster member of the present invention has a beam axle supporting the two caster wheels. The beam axle is pivotally joined to the bolster frame by a pin. The pin is aligned with a longitudinal axis of the bolster member. This allows for oscillation of the beam axle and caster wheels about the longitudinal axis of the soil conditioning implement responsive to changes in the elevation of the soil being conditioned. Such oscillation assists in maintaining the drum in even contact with the ground that is being conditioned.

3. The bolster member adjusts the height of the drum relative to the ground. In the past, the height of the bolster was adjusted by separately adjusting the height of each caster relative to the beam axle by adjusting the height of a caster pin relative to the knuckle at the end of the beam axle. This required two separate adjustments, one for each caster in order to effect a height difference of the drum relative to the ground surface. The present invention has an adjusting link. The adjusting link is pivotally coupled at a first end to the drum frame. The second end is adjustably coupled to the bolster frame. The relative length of the adjusting link may be set by varying the position on the adjusting link of two nuts that affix the adjusting link to the bolster frame. This single adjustment affixes the height of the casters relative to the drum and therefore adjusts how deeply the drum works the underlying soil.

4. More aggressive teeth. The drum of the present invention has more aggressive teeth than the prior art. The teeth have a sharper point that permits the rotating drum to rip out more deeply embedded plants during soil conditioning operations.

5. Crisscrossing tooth pattern on the drum. The tooth pattern design includes ten longitudinal rows of teeth wherein the teeth are spaced along a line parallel to the dimension L. The rows of teeth are numbered 1, 2a, 2b, 3a, 3b, 4, 5a, and 5b. The first tooth in each row as seen from the left of the drum corresponds to the numbering of the rows, e.g., row 1 has the leftmost first teeth and rows 6a, 6b have the rightmost first tooth. Rows 1 and 4 are not repeated. Rows 2a, 2b, rows 3a, 3b, rows 5a, 5b, and rows 6a, 6b are repeated, the teeth of the corresponding a and b rows being aligned radially in the R dimension. The arrangement of the rows relative to each other presents a crisscross pattern when viewed radially. During rotation of the drum, the crisscross pattern works the soil back and forth to produce an undulating pattern on the conditioned soil.

6. Drum replaceable shell. In the past, when the teeth were worn or the drum was otherwise damaged, the entire drum assembly including all the drive components had to be replaced. This is an expensive proposition, as the drum assemblies must be replaced on a fairly regular basis as a result of heavy usage. The drum assembly of the present invention has two readily separable components, an axle, including the drive components, and a cylindrical shell to which the teeth are attached. The shell may be readily removed from the axle and replaced without replacing the axle with its associated drive components.

7. Symmetrical drum. The drum is frequently operated with the longitudinal axis of the drum at an angle relative to the longitudinal axis of the soil conditioner implement. In such disposition, one end of the drum is typically advanced relative to the other end of the drum. When operated in a forward direction, small stones and other debris move laterally along the drum and are ejected in a windrow at the rearward end of the drum. When operated in this manner, the teeth that are proximate the forwardmost or leading end of the drum tend to wear much more quickly. By having a symmetrical drum of the present invention, the shell may simply be removed from the axle, reversed, and reinstalled on the axle. In such disposition, the teeth that were at the trailing end of the drum are now positioned proximate the leading end of the drum, replacing the worn teeth.

8. The drum assembly is easily removed. In the present invention there are no chains or sprockets coupling the motor and the drum. The motor assembly is directly coupled by means of splines to the drum assembly. Further, the motor assembly is easily removed. Once the motor assembly is removed, the first end of the drum assembly (that is engaged to the motor) is then free. Removing three additional bolts from the second end of the drum frees the second end of the drum and the drum assembly falls free of the drum frame.

9. Radial float assembly. The radial float assembly is pivotally coupled to the back plate by float pins pivotally engaged in pin receivers defined in the radial float assembly and corresponding receivers on the back plate. In this disposition, the radial float assembly is free to pivot about the float pin. It is noted that the float pin is at a certain height above the ground. The back plate is directly coupleable to the skid steer vehicle and is tiltable with respect to the skid steer vehicle. Tilting the back plate has the effect of decreasing the height that the float pin is above the ground when the back plate is tilted forward and increasing the height when the back plate is tilted rearward to a more vertical disposition. Since the casters always ride on the ground when the bolster member is in the soil engaging disposition, tilting the back plate forward (more toward the horizontal) has the effect of forcing the drum downward, thereby causing the drum to take a more aggressive bite at the ground. Thus the bite of the drum can be easily altered by an operator from the cab of the skid steer vehicle.

10. Fixed guards. Two fixed guards are projected forward relative to the drum. A fixed guard is disposed proximate either end of the drum. While the guards are removable, they are not reversible such that a guard could be positioned rearward of the drum. If the guards are utilized, they must always project forward relative to the drum.

11. Fixed deflectors. The present invention has a pair of depending fixed deflectors. A first deflector is affixed to the drum frame and is disposed slightly forward of a vertical plane passed through the drum. A second deflector is affixed to the drum frame and is disposed slightly rearward of a vertical plane passed through the drum centerline. The deflectors are preferably formed of a relatively hard rubber material and are replaceable. However, once in place, neither of the deflectors is adjustable in height relative to the position of the drum. Accordingly, the two deflectors are fixed relative to the drum.

The present invention is a soil conditioner implement designed for operation in cooperation with a supporting skid steer vehicle, the skid steer vehicle being moveable over the soil to be conditioned and having a source of hydraulic fluid under pressure for transmission to the soil conditioner implement for powering thereof and having a skid steer control system for providing a plurality of commands to the soil conditioner implement, the soil conditioner implement includes a drum member having a rotatable drum, the drum being selectively contactable with the soil to be conditioned. A bolster member is operably coupled to the drum member for supporting in part the drum member, the bolster member being shiftable between a soil engaging disposition and a flipped-up disposition, the bolster member being borne on the drum member when in the flipped-up disposition. The present invention is further a method of conditioning soil.

DETAILED DESCRIPTION OF THE DRAWINGS

Figure 1:
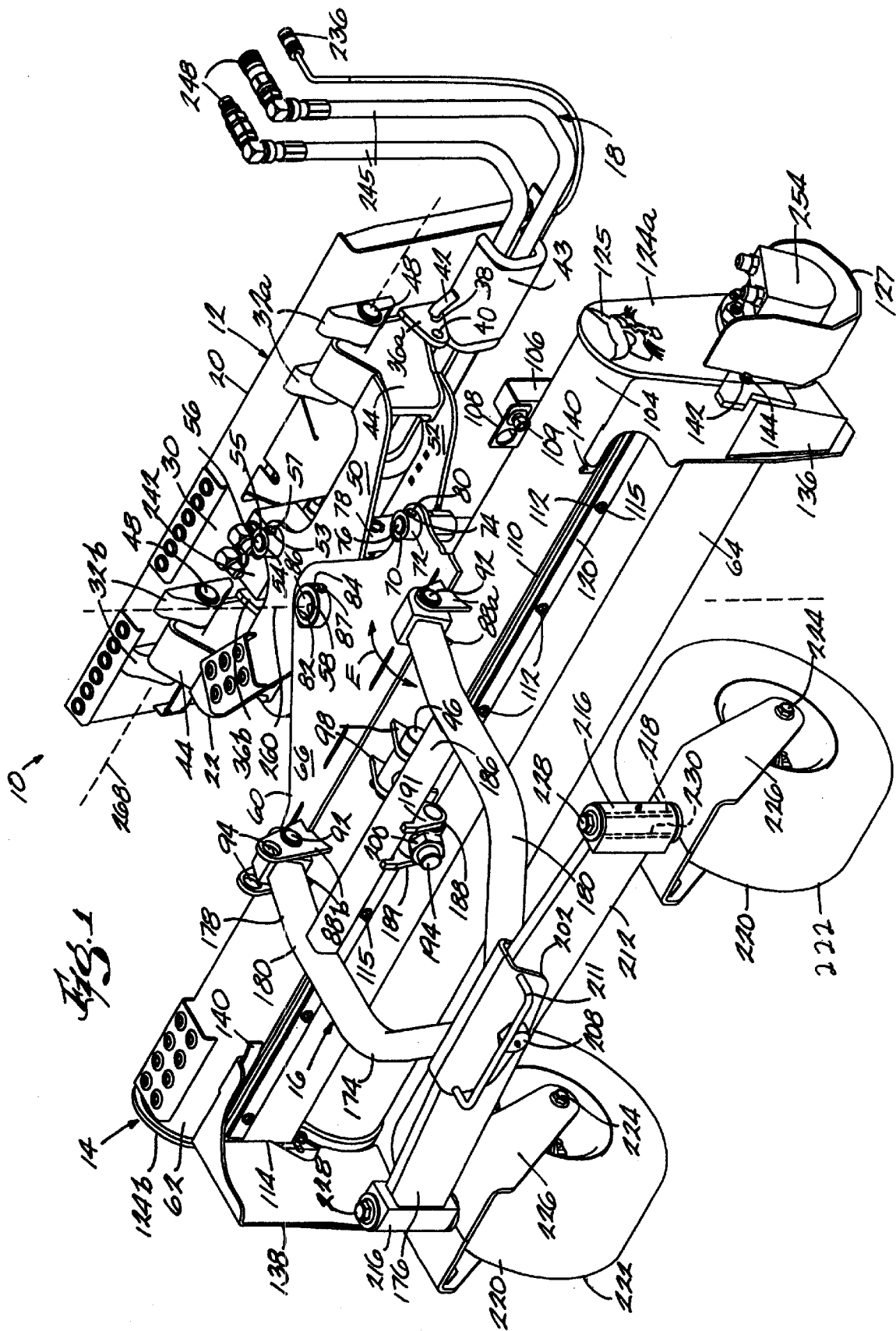
FIG. 1 is a perspective view of the soil conditioner implement of the present invention.

The soil conditioner implement of the present invention is shown generally at 10 in FIGS. 1, 2, 5, and 6. The soil conditioner implement 10 has four major components; mounting member 12, drum member 14, bolster assembly 16, and hydraulic assembly 18.

Figure 2:
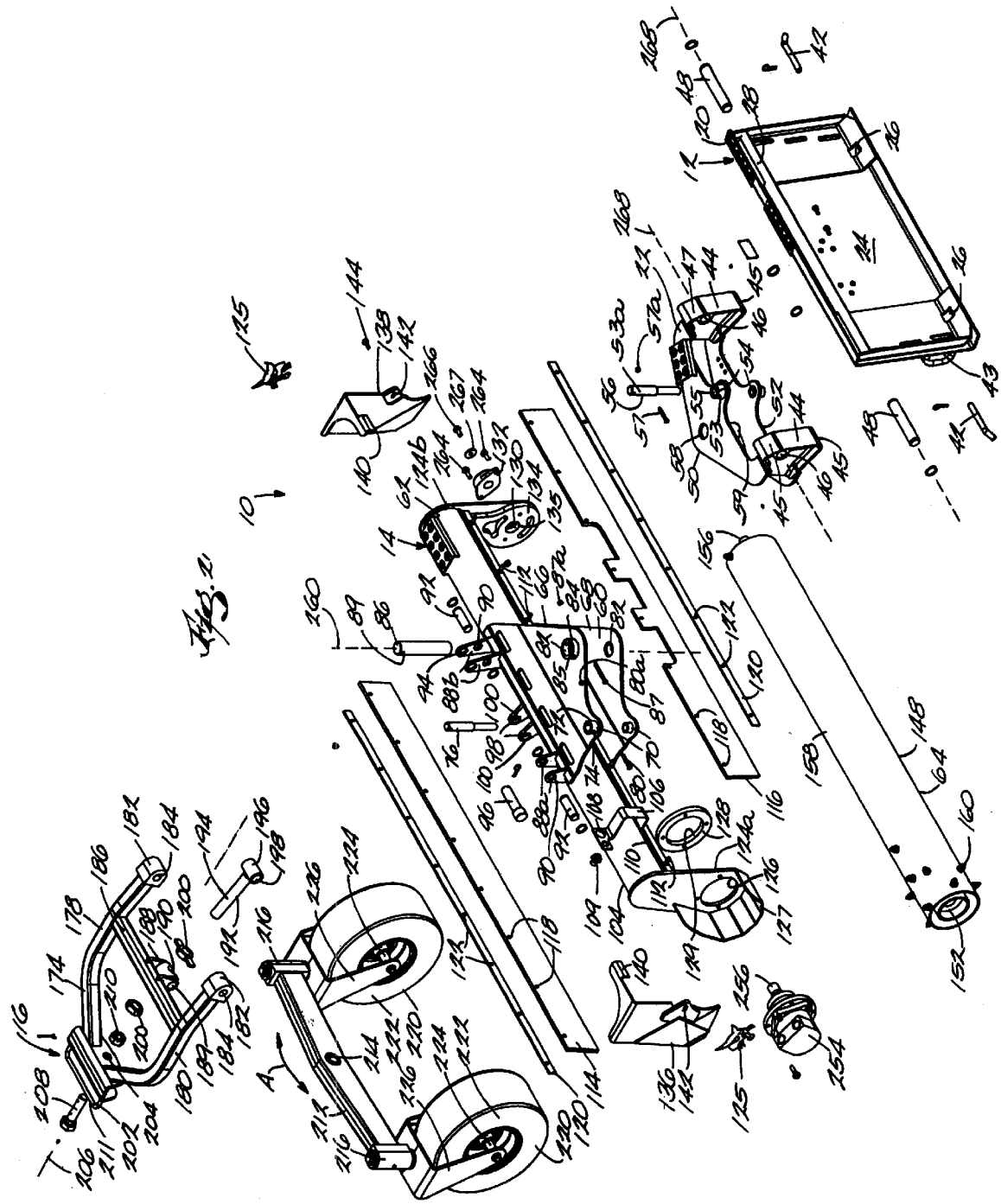
FIG. 2 is an exploded perspective view of the soil conditioner implement.

Referring primarily to FIGS. 1 and 2, the mounting member 12 of the soil conditioner implement 10 has two major subcomponents; back plate 20 and float assembly 22. The back plate 20 has a rear side margin 24. A pair of attaching apertures 26 are defined proximate the lower margin of the back plate 20. A depending lip 28 is provided proximate the top margin of the back plate 20. Preferably, a skid-steer vehicle on which the soil conditioner implement 10 is to be mounted has engaging members for engaging the attaching apertures 26 and the depending lip 28 to removably affix the soil conditioner implement 10 to the skid-steer vehicle. Such means for attaching implements to skid-steer vehicles are well known in the industry.

The back plate 20 has a front side margin 30 opposed to the rear side margin 24. A pair of spaced apart coupling bracket pairs 32a, 32b are fixedly coupled to the front side margin 30. Each bracket of each coupling bracket pair 32a, 32b has a pin bore 34 defined therein. The pin bores 34 of each of the brackets of the two coupling bracket pairs 32a, 32b are in registry when the soil conditioner implement 10 is viewed from the side.

A pair of locking brackets 36a, 36b are affixed to the front side margin 30. A locking bracket pair 36a, 36b is associated with each coupling bracket and has a first bracket member disposed slightly outboard of the outboard bracket of each of the coupling bracket pairs 32 and a second bracket member disposed slightly inboard of the outboard bracket of each of the coupling bracket pairs 32. Each of the bracket members of the locking bracket pairs 36a, 36b has two bores defined therein; a float bore 38 and a locked bore 40. A locking pin 42 may be disposed in either the float bore 38 or the locked bore 40 as desired. It should be noted in FIG. 1 that the locking pin 42 is disposed in the float bore 38.

A second component of the mounting member 12 of the soil conditioner implement 10 is the float assembly 22. The float assembly 22 has a pair of spaced apart mounts 44. Each of the mounts 44 has a pin receiver 46 defined therethrough. A pair of float pins 48 are pivotally disposable in the pin receiver 46 and respective pin bore 34 of each bracket of a respective coupling bracket pair 32. In such disposition, the float pins 48 couple the float assembly 22 to the back plate 20.

The float assembly 22 is permitted to pivotally float relative to the back plate 20 when the locking pin 42 is disposed in the float bore 38. The locking pin 42, when so disposed, substantially underlies the lower margin of the mount 44 so that the locking pin 42 does not interfere with the floating motion of the mount 44. The float bore 38 may be thought of as a place to store the locking pin 42. In this manner, the back plate 20 can be elevated by operation of the skid steer vehicle to disengage the soil conditioning implement 10 from the underlying ground surface. When the corner margin 45 of the mount 44 comes into engagement with the front side margin 30 of the backplate 20, float is arrested and the entire soil conditioning implement 10 may be lifted free of the ground, even when in the float condition.

Conversely, the float assembly 22 is substantially fixed relative to the back plate 20 when the locking pin 42 is disposed in the locked bore 40. In such disposition, the locking pin 42 is engaged with both locked bores 40 of the respective locking bracket pair 36a, 36b and with the underside margin of the mount 44 of the float assembly 22 to limit the downward float relative to the back plate 20., thereby fixing the float assembly relative to the back plate 20. The float function is described in greater detail below. By having the locking pin engage the underside margin of the mount 44, the float assembly is locked without requiring the user to align bores 40 with bores defined in the mount 44 in order to lock the float assembly 22. It should be noted that even in the locked disposition, the float assembly 22 has approximately 4–5 degrees of rotational freedom.

Hose support 43 projects forward of front side margin 43. The support 43 defines an internal passage and typically encloses a plurality of hoses and communication lines. See FIGS. 6 and 7.

The float assembly 22 additionally includes a mounting member upper plate 50 and a spaced apart mounting member lower plate 52. The upper plate 50 and lower plate 52 project forward from the two mounts 44 and are generally in a parallel disposition. A pair of cylinder bores 54 are defined in their respective plates 50, 52. The cylinder bore 54 defined in the upper plate 50 as a collar 55 having a pair of transverse bores 53 defined therein. A first hydraulic cylinder pin 56 is disposable in the cylinder bores 54. The first cylinder pin 56 may be locked in place by a locking bolt 57 passed through the transverse bores 53 and a transverse bore 53a defined in the first cylinder pin 56. The locking bolt 57 is secured by a nut 57a As will be seen, the first cylinder pin 56 is utilized to secure a first end of a hydraulic cylinder 78 (depicted in FIG. 8). A generally orthogonally disposed connecting tube 59 having a longitudinal bore defined therein, couples the pivot coupling bores 58 defined in each of the plates 50, 52.

The second major component of the soil conditioner implement 10 is the drum member 14. The drum member 14 has three major subcomponents; the drum frame 60, the transverse support 62, and the drum assembly 64. The drum frame 60 includes an upper frame plate 66 and a lower frame plate 68. The two plates 66, 68 are spaced apart in a generally parallel relationship. The distance between the inside margin of the plates 66, 68 is slightly greater than the distance between the outside margin of the mounting member upper and lower plates 50, 52 in order to facilitate to receive the mounting member upper and lower plates 50, 52 between the plates 66, 68.

A pair of cylinder bores 70 are defined in the plates 66, 68. Cylinder bore 70 has a collar 72 having a transverse bore 74 defined therein. A second cylinder pin 76 is disposable in the cylinder bores 70 and may be held in place in a manner similar to the first cylinder pin 56 by in sertion of a locking bolt 80 through the bore 74 and a corresponding bore defined in the second cylinder pin 76. The locking bolt 80 is secured by a nut 80a. As will be seen, the second cylinder pin 76 is utilized for engaging a second end of the hydraulic cylinder 78 (see FIG. 8).

A pair of pivot coupling bores 82 are defined in the plates 66, 68. A collar 84 is disposed on the upper surface of the upper frame plate 66, defining a portion of the coupling bore 82. The collar 84 has a transverse bore 85 defined therein. A pivot pin 86 is disposable in the pivot coupling bores 58, 82 to pivotally couple the drum member 14 to the mounting member 12. Pivot pin 86 has a transverse bore 89 defined therethrough. When the transverse bore 89 is in registry with the transverse bore 85, a locking bolt 87 may be inserted therein to lock the pivot pin 86 in the pivot coupling bores 58, 82. The locking bolt 87 is secured by a nut 87a.

Two bolster bracket pairs 88a, 88b are affixed proximate the front margin of the upper frame plate 66. Each of the bolster bracket pairs 88a, 88b are directed generally upward from the upper frame plate 66. Each bracket of each bolster bracket pairs 88a, 88b has a pin bore 90 defined therein. A pin 92 may be inserted into the pin bores 90 to pivotally couple the bolster assembly 16 to the drum member 14. More details of such coupling are provided below. It should be noted that the bolster bracket pair 88b has a pair of lockup bores 94 in addition to the pin bores 90. A lockup pin 96 is provided for disposition in the lockup bores 94. As will be seen, the lockup pin 96 may be utilized in such manner to hold the bolster assembly 16 in a flipped up disposition.

An adjusting link bracket pair 98 is disposed generally between the bolster bracket pairs 88a, 88b. The adjusting link bracket pair 98 generally projects forward from the drum member 14. A pin bore 100 is defined in each of the brackets of the adjusting link bracket pair 98.

The transverse support 62 includes a tubular beam 104. Tubular beam 104 is preferably positioned between the upper frame plate 66 and the lower frame plate 68, the plates 66, 68 being welded generally tangential to the tubular beam 104. A hose retainer 106 is preferably affixed to the rear side of the tubular beam 104. An upwardly directed tab on the hose retainer 106 comprises an electric cable receiver 108. The electronic cable receiver 108 includes a dummy socket 109 for storing the end of an electronic cable and when the soil conditioner implement 10 is detached from the skid steer vehicle. A pair of deflector support bars 110 are affixed to the tubular beam 104, being substantially coextensive with the beam 104 in a longitudinal dimension. A first deflector support bar 110 is affixed at the rear of the tubular beam 104, as depicted in FIG. 2 while a second deflector support bar 110 is diametrically opposed to the first deflector support bar 110 at the front of the tubular beam 104, as depicted in FIG. 1. The deflector support bars 110 have a plurality of spaced apart outwardly directed studs 112 disposed thereon. A front deflector 114 may be suspended from the studs 112 of the second deflector support bar 110 and a rear deflector 116 may be suspended from the studs 112 of the rear first support bar 110.

Each of the deflectors 114, 116 is preferably formed of a resilient, rather thick sheet of rubber material. A plurality of stud bores 118 matching the placement of the studs 112 are defined in the deflectors 114, 116. A retaining bar 120 is utilized to support the deflectors 114, 116 on the respective deflector support bars 110.

Accordingly, the retaining bar 120 has a plurality of stud bores 122 defined therein that also align with the studs 112 of the respective deflector support bar 110. In assembly, the deflectors 114, 116 are suspended from the studs 112. The respective retaining bar 120 is then also suspended from the studs 112 and a plurality of nuts 115 (see FIG. 1) are threaded onto the studs 112 to secure the deflectors 114, 116 to the tubular beam 104. It should be noted that the height of the deflectors 114, 116 relative to the drum assembly 64 is fixed once the deflectors 114, 116 are in place. While the deflectors 114, 116 may be readily replaced when worn, there is no height adjustment of the deflectors 114, 116.

A pair of depending end plates 124a, 124b are disposed at the respective ends of the tubular beam 104. A Bobcat logo decal 125 is provided for affixing to each of the depending end plates 124a, 124b. The end plate 124a has a motor bore 126 defined therein. A generally semicircular, outwardly directed motor guard 127 is disposed beneath the motor bore 126. A backing plate 128 may be affixed to the inner margin of the end plate 124a. The backing plate 128 also has a motor bore 129 defined therein. The motor bore 129 is in registry with the motor bore 126.

Turning to the right depending end plate 124b, an axle bore 134 is defined therein. A bearing 132 is mounted on the outer margin surface of the end plate 124b and is in registry with the axle bore 130. A backing plate 134 may be disposed on the inner margin of the end plate 124b. The backing plate 134 has an axle bore 135 defined therein, the axle bore 135 and the axle bore 130 being in registry.

A pair of forwardly extending guards are removably disposed proximate each of the end plates 124a, 124b respectively. The guards comprise a left guard 136 and a right guard 138. Each of the guards 136, 138 are mirror images of one another. The guards 136, 138 are removably affixed to the tubular beam 104 by an engaging tab 140 being disposed in a cooperating slot defined proximate the leading edge of the tubular beam 104. Further, a bore 142 is defined proximate the trailing edge of the respective guards 136, 138. A bolt 144 may be disposed in the bore 142 and threaded into a bore (not shown) defined in the respective end plate 124a, 124b to couple the respective guard 136, 138 to its associated end plate 124a, 124b.

Figure 3:
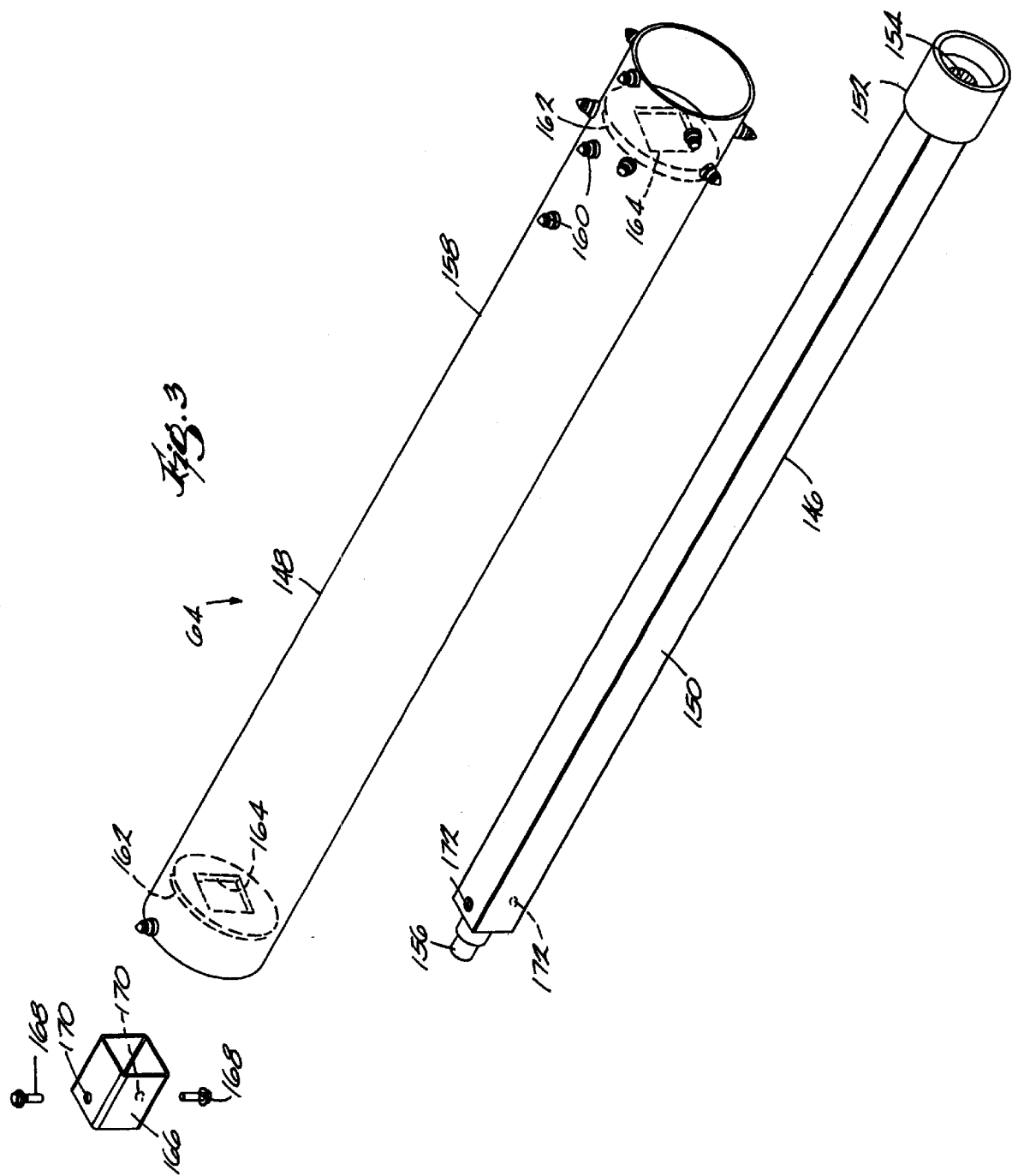
FIG. 3 is a perspective view of the drum assembly of the soil conditioner implement.

The drum assembly 64 of the drum member 14 is rotatably disposed generally beneath the tubular beam 104 and supported by the depending end plates 124a, 12b. The drum assembly 64 has two major subcomponents; axle 146 and shell 148, as depicted in FIG. 3. The center portion of the axle 146 is comprised of a box section member 150. A collar 152 is disposed at a first end of the box section member 150. The collar 152 has a bore defined therein presenting a plurality of splines 154. In assembly, the splines 154 are engaged with cooperating splines presented on a motor output shaft. An axle stub end 156 is disposed at the second end of the box section member 150. In assembly, the axle stub end 156 is rotatably borne in the bearing 132. The collar 152 is disposed proximate the motor bores 126, 129 and is coupled to the hydraulic motor 254 as will be described in greater detail below.

The shell 148 is symmetrical along a longitudinal axis and is therefore reversible on the axle 146. The shell 148 comprises a shell cylinder 158 that is a relatively thin walled tube. A plurality of teeth 160 project from the outer margin of the shell cylinder 158. A pair of drive disks 162 are disposed coextensive with the inner margin of the shell cylinder 158 equidistant from the respective ends of the shell cylinder 158. Each of the drive disks 162 has a square aperture 164 defined therein. The dimensions of the square aperture 164 are generally slightly greater than the dimensions of the box section member 150 so that the axle 146 may be readily slid within the shell 148. The drive disks 162 impart the rotational motion of the axle 146 derived from the motor 254 to the shell 148. In assembly, the axle 146 is slid into the shell 148 from the right as depicted in FIG. 3. After passing through both of the square apertures 164, a retainer 166 is slid onto the box section member 150 over the axle stub end 156. The retainer 166 fixedly retains the shell 148 on the axle 146. Once in position on the box section member 150, bolts 168 are passed through bores 170 defined in the retainer 166 and threadedly engaged with corresponding threaded bores 172 defined in opposing surfaces of the box section member 150.

Figure 4:
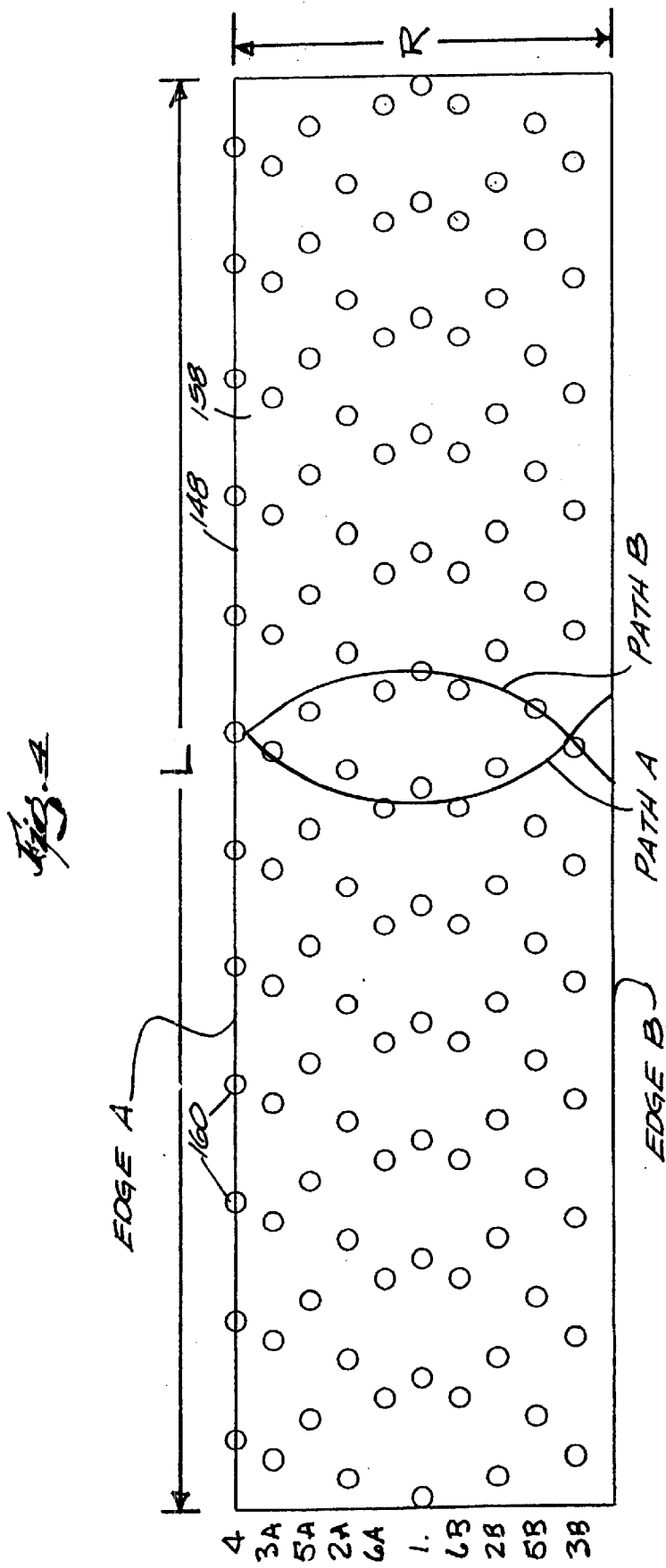
FIG. 4 is a plan form view of a flattened drum shell, depicting the placement of all the teeth of the drum shell.

Turning to FIG. 4, there is depicted a flattened shell 148 as though a single longitudinal cut were made through the shell cylinder 158 to define two edges a and b. The circles presented on the shell 148 represent the plurality of teeth 160 projecting from the outer margin of the shell 148. The rows of teeth extend from left to right with all of the teeth in a row being spaced equidistantly. Further, when viewed along the L dimension, all the teeth in all the rows are spaced equidistantly. There are 10 rows of teeth numbered at the left margin of the depiction. Rows 1 and 4 are not repeated while rows 2a, b, 3a, b, 5a, b, and 6a, b, are repeated in the pattern depicted. The numbering of the various rows corresponds to the distance from the left hand margin that the first tooth 160 appears in the row. Accordingly, row 1 has the left most first tooth 160 and rows 6a, b have the right most first tooth 160. An advantage of the tooth pattern of the shell 148 is that when rotating, the teeth 160 impart an undulating pattern to the soil being conditioned by the soil conditioner implement 10 as the drum assembly 64 works lo either forward or backward over the ground. This is the result of the generally crisscross pattern of the teeth 160 exemplified by the two paths A and B imposed on the pattern of teeth 160.

Returning to FIGS. 1 and 2, the third major component of the soil conditioner implement 10 is the bolster assembly 16. The bolster assembly 16 includes two major subcomponents; bolster frame 174 and carriage 176.

The bolster frame 174 of the bolster assembly 16 defines a fork 178 having two spaced apart tines 180. Each of the tines 180 terminates at a distal end with a coupler 182. The respective couplers 182 have a transverse bore 184 defined therein. In assembly, the couplers 182 are engaged within respective bolster bracket pairs 88a, 88b with the pins 92 passing through the pin bores 90 defined in their respective bolster bracket pair 88a, b and through the respective transverse bore 184 of the couplers 182.

A cross member 186 extends between the two tines 180 and is fixedly coupled thereto. An adjusting link receiver 188 depends from the cross member 186. The adjusting link receiver 188 includes a pair of spaced apart brackets 191. The brackets 191 rotatably support a trunion 189. The receiver is a solid cylindrical pin. A generally longitudinal bore 190 extends through the trunion 189. An adjusting link 192 is disposed through the longitudinal bore 190, extending on both sides of the trunion 189.

The adjusting link 192 has a threaded shank 194 that terminates at a proximal end with a coupler 196. The coupler 196 has a transverse bore 198 defined therein. In assembly, the coupler 196 is disposed between the brackets of the adjusting link bracket pair 98. The lock up pin 96 may then be inserted through the pin bores 100 defined in the brackets of the adjusting link bracket pair 98 and through the transverse bore 198 of the coupler 196 to pivotally secure the adjusting link 192 to the drum member 14. A pair of spaced apart adjusting nuts 200 are disposed in threaded engagement with the shank 194 and positioned one adjusting nut 200 on either side of the adjusting link receiver 188. When the adjusting nuts 200 are snugged up against the adjusting link receiving 188, the length of the shank 194 extending between the drum member 14 and the bolster assembly 16 is fixed at a certain length, thereby fixing the position of the bolster assembly 16 relative to the drum member 14.

The fork 178 terminates at a proximal end with a yoke 202. The yoke 202 has a generally longitudinally oriented bore 204 defined therethrough. The axis of the bore 204 is generally aligned with a longitudinal axis 206. A pivot bolt 208 is disposable in the longitudinal bore 204 and affixed therein by a nut 210. A bail 211 is disposed at the front margin of the yoke 202 to assist in shifting the bolster assembly 16 between the soil engaging disposition of FIGS. 1 and 7 and the flipped up disposition of FIGS. 5 and 6.

The second component of the bolster assembly 16 is the carriage 176. The carriage 176 depends from and is supported by the bolster frame 174. A bolster 212 is disposed generally transverse to the longitudinal axis 206. The bolster 212 has a generally centrally disposed bore 214 defined therein. The bore 214 is brought into registry with the longitudinal bore 204 defined in the yoke 202. When the bolster 212 is secured to the bolster frame 174, the carriage 176 is permitted to oscillate relative to the bolster frame 174 in a plane that is substantially orthogonally disposed with respect to the longitudinal axis 206.

A pair of knuckles 216 are disposed one at either end of the bolster 212. Each knuckle has a substantially vertically oriented bore 218 defined therein. A caster assembly 220 depends from each of the knuckles 216.

The caster assembly 220 includes a rotatable ground engageable wheel 222. The wheel is rotatably supported on an axle 224. The axle 224 is in turn borne in a wheel support 226. An spindle 230 is affixed to the wheel support 226. The spindle 230 is rotatably received within the vertical bore 218 of the knuckle 216 and secured therein by a bolt 228.

Figure 5:
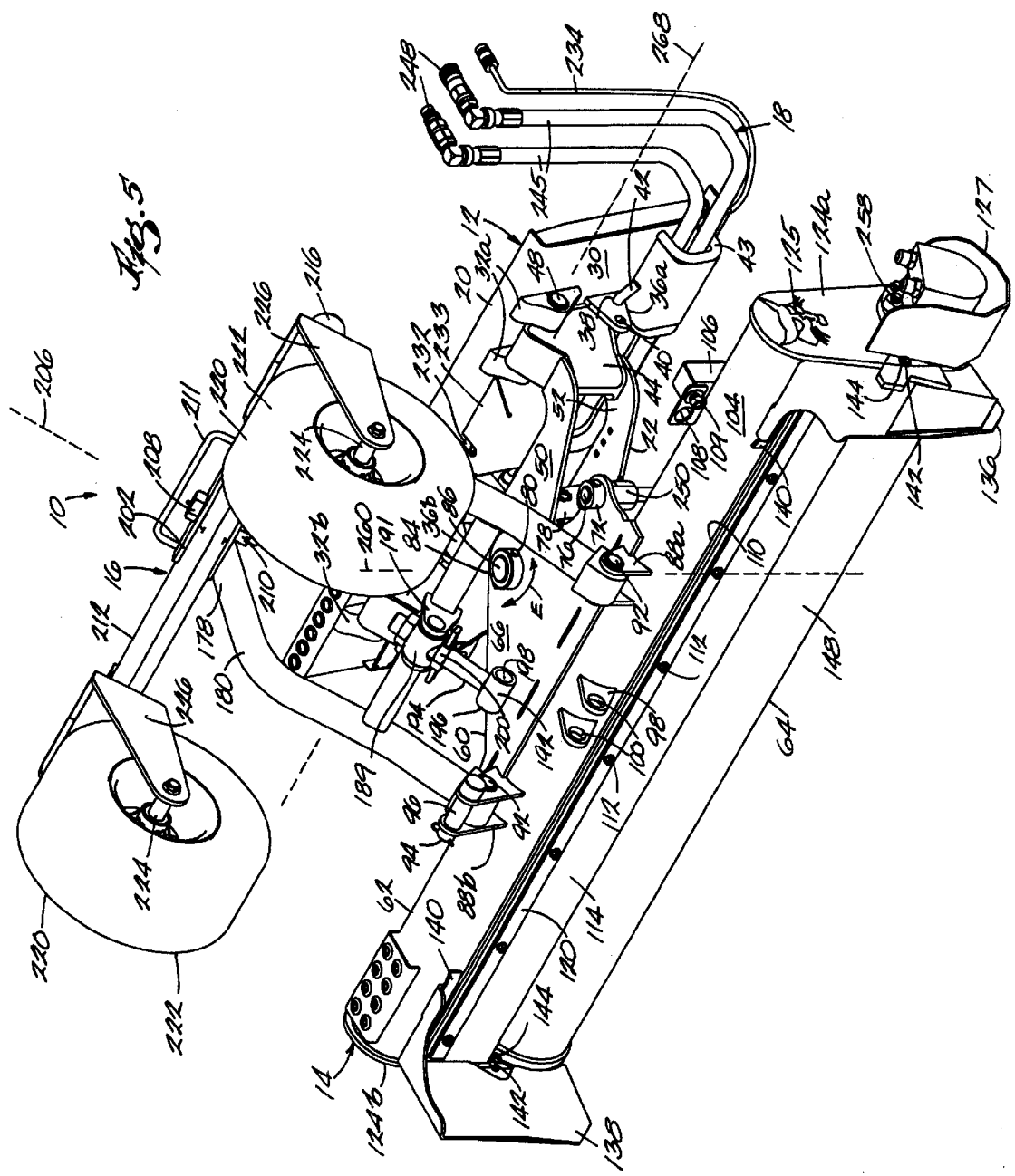
FIG. 5 is a perspective view of the soil conditioner implement with the bolster member in the flipped up disposition.
Figure 6:
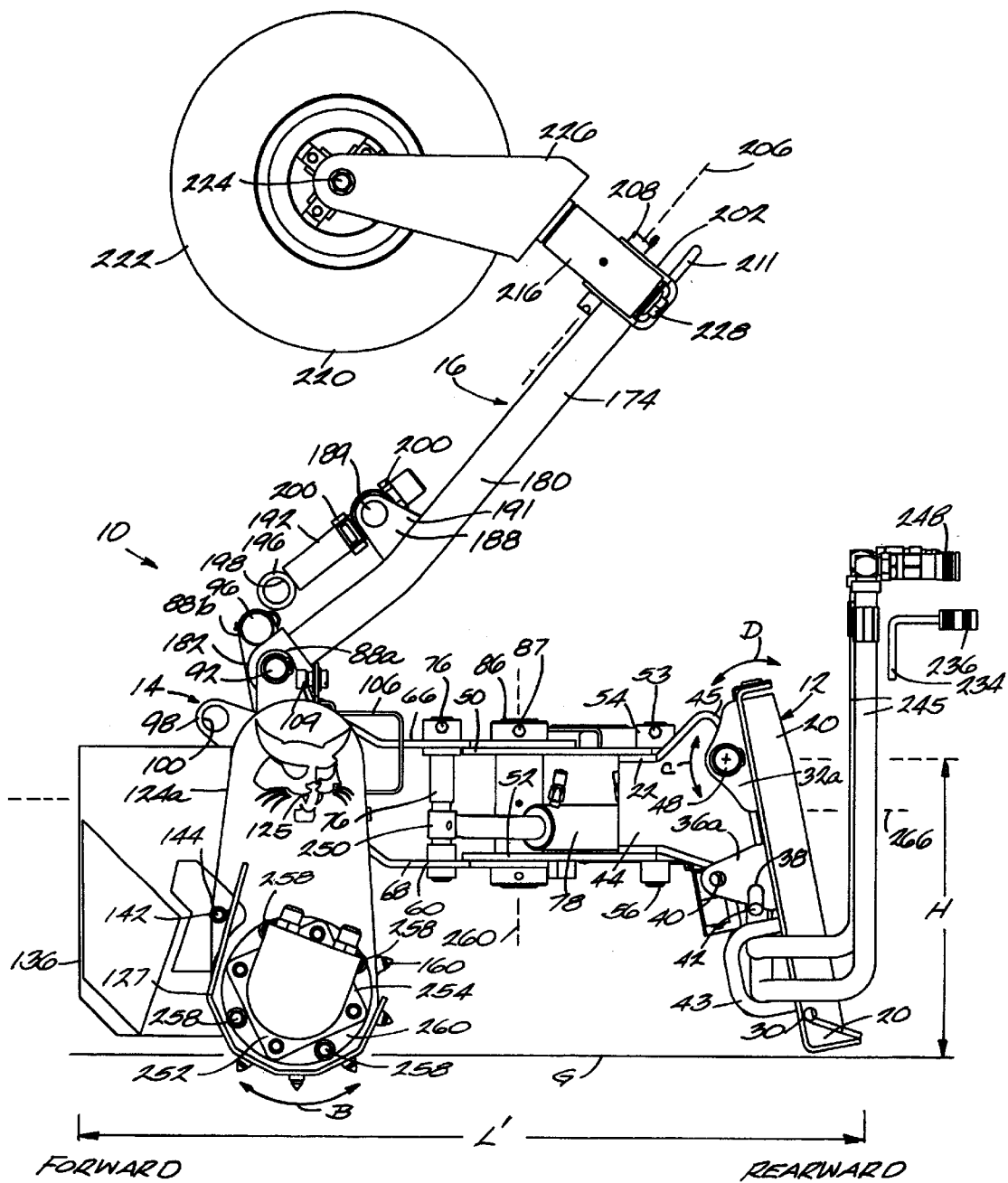
FIG. 6 is a side elevational view of the soil conditioner implement with the bolster member in the flipped up disposition.
Figure 7:
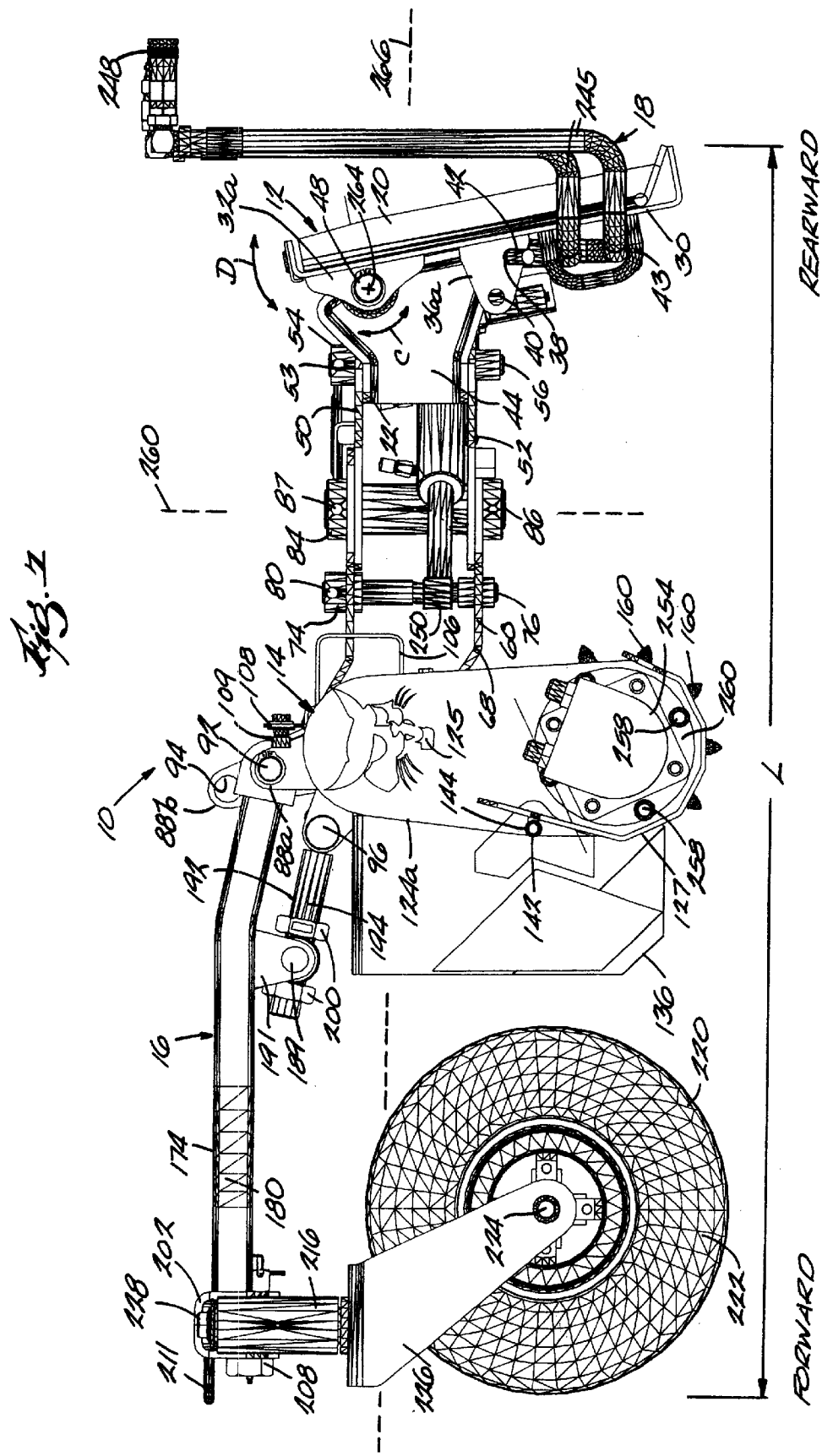
FIG. 7 is a side elevational view of the soil conditioner implement with the bolster member in the soil engaging disposition and FIG. 8 is an exploded view of the hydraulic assembly of the soil conditioner implement.

Motion of the various components of the soil conditioner implement 10 is discussed below relative to three orthogonally disposed axes: the longitudinal X axis 266 (FIGS. 6 and 7), the front Y axis 264 (FIGS. 2 and 5–7), and the pivot Z axis 260 (FIGS. 2, 6, and 7).

Figure 8:
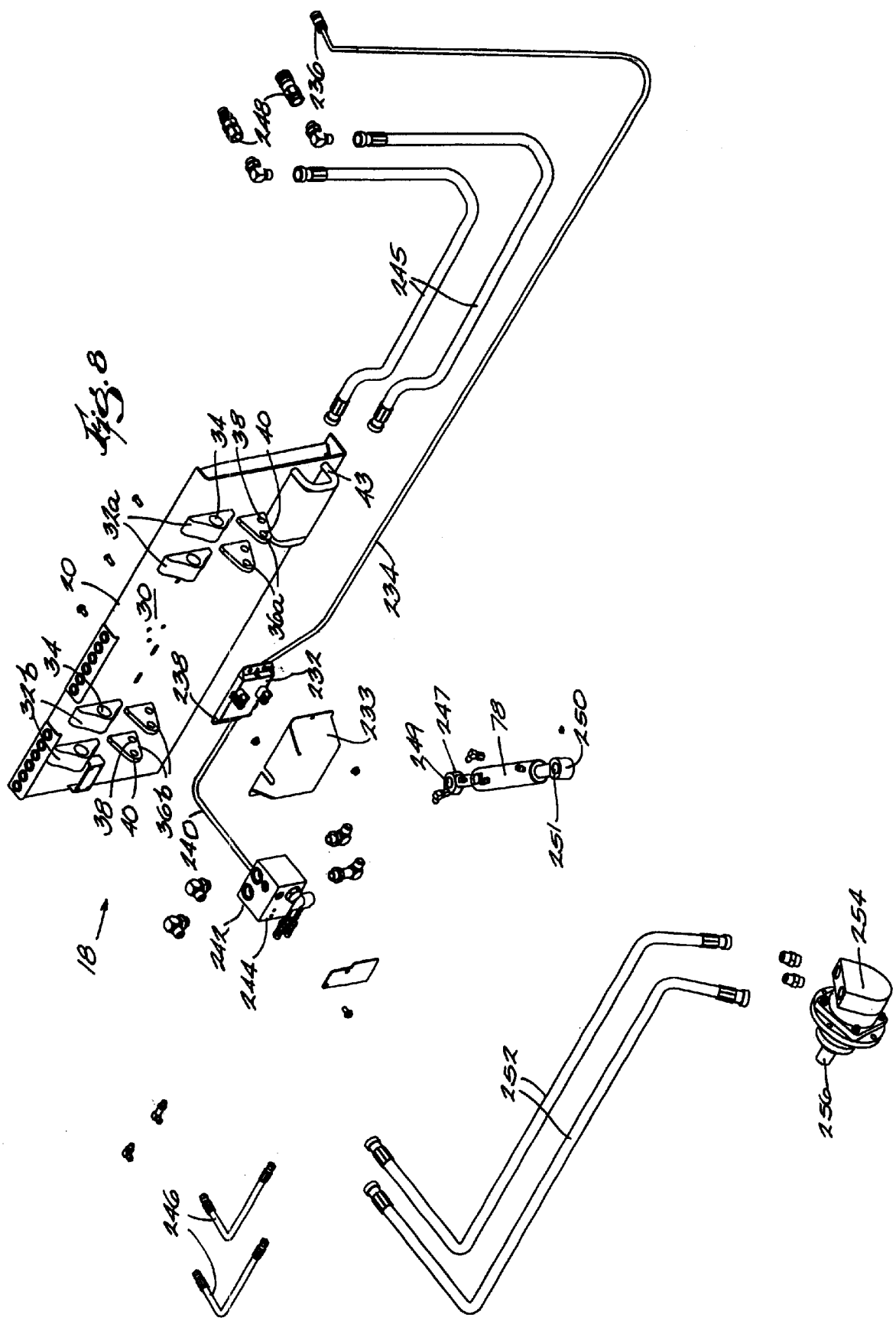

The final major component of the soil conditioner implement 10 is the hydraulic assembly 18. Various components of the hydraulic system 18 are depicted throughout the Figures. The full hydraulic system 18 is depicted in FIG. 8.

The hydraulic system 18 includes a control module 232. The control module 232 is mounted to the front side margin 30 of the back plate 20. The control module 232 is covered by a cover 233 that assists in protecting the control module 232 from dirt and debris. An electronic cable 234 extends from the control module 232 and terminates at a distal end with a connector 236. The connector 236 is coupled to a cooperative connector mounted on the skid steer vehicle that supports the soil conditioner implement 10. Commands from an operator sitting in the cab of the skid steer vehicle are relayed to the control module 232 via the electronic cable 234. It should be noted that when the soil conditioner implement 10 is detached from the skid steer vehicle, the coupler 236 may be engaged in the socket 109 in order to store the electronic cable 234 and to maintain the cleanliness of the coupler 236.

The control module 232 includes a processor 238. The processor 238 accepts the command input signals sent via the electronic cable 234 and translates them into suitable commands for operation of the various components of the soil conditioner implement 10. The commands generated by the processor 238 are sent via an interface 240 to the hydraulic system 242.

The hydraulic system 242 includes a valve 244, the valve 244 being fluidly coupled to suitable plumbing for conveying hydraulic fluid to the actuator components of the soil conditioner implement 10. The valve 244 has a number of selectively actuatable valves contained therein. Preferably, these valves are operatable by solenoids responsive to the commands provided by the processor 238.

A flow of hydraulic fluid under pressure is provided to the valve 244 by the hydraulic supply hoses 245. Each of the hydraulic supply hoses 245 has a coupler 248 for coupling to the hydraulic supply of the skid steer vehicle. In this manner, the soil conditioning implement 10 derives its hydraulic power from the skid steer vehicle on which the soil conditioning implement 10 is mounted.

Hydraulic cylinder tubing 246 extends between the valve 244 and the hydraulic cylinder 78. The hydraulic cylinder 78 has a first end coupler 247 having a bore 249 defined therein. The first cylinder pin 56 passes through the bore 249, thereby coupling the first end of the hydraulic cylinder 78 to the float assembly 22. The hydraulic cylinder 78 has a second end coupler 250 having a bore 251 defined therein. The second cylinder pin 76 passes through the bore 251, thereby coupling the second end of the hydraulic cylinder 78 to the drum member 14. Hydraulic fluid passing through the cylinder tubing 246 acts to either extend or retract the hydraulic cylinder 78. Such extension/retraction acts on the drum member 14 to rotate the drum member 14 relative to the mounting member 12. Such rotation is indicated by arrow E of FIG. 5 and occurs about the Z-axis 260. See FIGS. 6 and 7. Extending the hydraulic cylinder 78 acts to advance the end of the drum member 14 bearing the motor 254 while retraction of the hydraulic cylinder 78 acts to advance the opposite end of the drum member 14.

A second routing of hydraulic fluid by the valve 244 is to the reversible motor 254. Hydraulic fluid under pressure is conveyed to the motor 254 via hydraulic motor hoses 252. As indicated, the motor 254 is reversible, running equally as well in either of two directions. When it is desired to reverse direction of rotation of the motor 254 (this is typically done when the direction of operation of the skid steer vehicle is effected) a command is made in the skid steer vehicle reversing the direction of flow in the hoses 245. By far the greatest portion of the hydraulic fluid flow to the implement 10 is to drive the motor 254 as distinct changing the angle of the drum member 14, as described above. The valve 244 need not reconfigure itself to reverse the direction of flow in the two hydraulic motor hoses 252. This minimizes the fluid handling capacity required in the valve 244 itself by relying on the skid steer vehicle to effect the change in direction of rotation of the motor 254.

Such reversal of hydraulic fluid flow effects a reversal of the direction of rotation of the reversible motor 254. In this way, the drum assembly 64 may be operated with either a clockwise or counterclockwise direction of rotation as indicated by arrow B in FIG. 6. Typically, when the soil conditioning implement 10 is being operated in a forward direction as indicated by leftward motion in FIGS. 6 and 7, the direction of rotation of the drum assembly 64 is typically clockwise. Conversely, when the soil conditioner implement 10 is being operated in a rearward direction, to the right as depicted in FIGS. 6 and 7, the direction of rotation of the drum assembly 64 is typically counterclockwise.

FIGS. 6 and 7 are also useful to describe additional motions of the soil conditioner implement 10. The first of such motions is that the drum member 14 and bolster assembly 16 are free to float, that is to rotate, about the float axis 268 (see also FIGS. 1, 2, and 5) defined by the longitudinal axis of the float pins 48. The float motion is indicated by the arrow C. The float motion occurs when the locking pin 42 is in the float bore 38, free of interference with the mount 44. Counterclockwise float is arrested when the corner margin 45 of the mount 44 bears on the front side margin 30 of the backplate 20. Clockwise float about the float pins 48 is arrested when the angled surface 47 of the mount 44 bears against the front side margin 30 of the backplate 20.

When the locking pin 42 is disposed in the locked bore 40, the locking pin 42 passes beneath the underside margin of the mount 44 in an engaging relationship with the, underside margin of the mount 44, thereby locking the mount 44 semi-rigidly to the backplate 20. In this disposition, the float assembly 22 is restrained relative to the backplate 20.

Another motion is as indicated by arrow D. The backplate 20 is tiltable responsive to a command by an operator of the skid steer vehicle. This tilting is effected independent of the hydraulic system 18 and is an option available through the normal controls of the skid steer vehicle. The float pins 48 are effectively the rear supports of both the drum member 14 and bolster assembly 16. The height H of the float pin 48 above the ground G is determined by the tilt of the backplate 20 as indicated by arrow D. Tilting the backplate 20 forward to a more horizontal disposition results in decreasing the height H of the float pin 48 above the ground G. The effect of such decrease in height is to force the drum assembly 64 deeper into the soil being conditioned, thereby causing the drum assembly 64 to take a more aggressive bite of the soil. Conversely, rotating the backplate 20 clockwise to a more vertical disposition results in raising the height H of the float pins 48 above the ground G. This effectively raises the drum assembly 64, resulting in a less aggressive bite of the soil being conditioned. It is to be understood that when the bolster assembly 16 is in the ground engaging disposition as depicted in FIGS. I and 7, the drum member 14 and bolster assembly 16 comprise a single rigid unit supported at the forward edge of the soil conditioner implement 10 by the engagement of wheels 222 with the ground G and supported at the rear by the float pins 48. When the float assembly 22 is held rigid to the backplate 20 by the locking pin 42 engaged in the locked bore 40, counterclockwise rotation of the backplate 20 actually forces the drum assembly 64 into the soil. When the float assembly 22 is allowed to float by the locking pin 42 being disposed in the float bore 38, tilting the backplate 22 forward in the counterclockwise direction results in the weight of the soil conditioner implement 10 causing the drum assembly 64 to take a more aggressive bite of the soil being conditioned.

The bite of the drum assembly 64 can be effected in a further way. As indicated above, the drum member 14 and bolster assembly 16 comprise a single rigid unit when the bolster assembly 16 is in the ground engaging disposition of FIGS. 1 and 7. This rigidity is effected by the adjusting link 192 having a selected fixed effective length between the drum member 14 and bolster assembly 16. Varying this effective length by varying the position of the adjusting nuts 200 on the threaded shank 194 decreases or increases the effective length of the adjusting link 192 and results in rotation of the bolster assembly 16 relative to the drum member 14 as indicated by the arrow E in FIG. 1. For example, lengthening the effective length of the adjusting link 192 results in the bolster assembly 16 rotating in a clockwise direction relative to the drum member 14. This effectively raises the wheels 222 relative to the drum assembly 64. Since the wheels 222 will continue to ride on the ground G, such raising forces the drum assembly 64 lower with respect to the ground G, thereby causing the drum assembly 64 to take a more aggressive bite of the soil being conditioned.

A further feature of the soil conditioner implement 10 is depicted in FIGS. 5 and 6. The bolster assembly 16 of the soil conditioner implement 10 is shiftable between a ground engaging disposition as depicted in FIGS. 1 and 7 and a flipped up disposition as depicted in FIGS. 5 and 6. In the flipped up disposition, the bolster assembly 16 is supported on the drum member 14. To effect the shifting to the flipped disposition, the lock up pin 96 is withdrawn from engagement with the adjusting link bracket pair 98 and with the transverse bore 198 of the coupler 196 that forms a portion of the adjustable link 192. Once withdrawn, the adjustable link 192 is free of the drum member 14 and the bolster nut member 16 is free to rotate about the pins 92 disposed in the bolster bracket pairs 88a, 88b. An operator may then grasp the bail 211 and rotate the bolster assembly 16 from the disposition of FIGS. 1 and 7 to the disposition of FIGS. 5 and 6. Once in the flipped up disposition of FIGS. 5 and 6, the lock up pin 96 may be inserted in the lock up bores 94 of the bolster bracket pair 88b to lock the bolster assembly 16 in the flipped up disposition.

The flipped up disposition of the bolster assembly 16 has a number of advantages. The first is that it substantially reduces the length of the soil conditioner implement 10 to facilitate transporting the soil conditioner implement 10 mounted on a skid steer vehicle and positioned on a relatively short trailer compare the length L of FIG. 7 to the length L' of FIG. 6. Further, an operator may advance the soil conditioner implement while operating very close to an object for the conditioning of soil close to the object, such as for example the foundations of buildings, walls and vegetation. This is especially true when the guards 136, 138 are removed. Additionally, where an unmarked surface of the soil after conditioning is desired, the soil conditioner implement 10 can be operated in a rearward direction and leave no wheel marks after conditioning of the soil.

A further feature of the soil conditioner implement 10 of the present invention is the ready replacability of the drum assembly 64. In the past, drum assemblies were integral unitary devices in which all the drive components, the axle and the cylindrical drum were all one unit. With the present invention, the axle 146 may be readily withdrawn from the shell 148. When the shell 148 (particularly the teeth 160) becomes worn, the shell 148 may be simply replaced and reusing the original axle 146 with it attendant drive components.

When the drum assembly 64 is operated with one or the other ends advanced to generate a windrow of debris, the teeth 160 that are proximate the advanced end of the shell 148 become one at a much quicker rate than the teeth that are proximate the end of the shell 148 that is lagging. An advantage of the design of the present invention is that the shell 148 is symmetrical and may be reversed on the axle 146. The usable life of the shell 148 is thereby extended by positioning the substantially unworn teeth 160 proximate the leading end of the drum assembly 64.

Coupled with this, is the ease with which the drum assembly 64 may be separated from the transverse support 62 of the drum member 14. As is indicated in FIG. 6, the hydraulic motor 252 is coupled to the depending end plate 124a by four bolts that pass through bores defined in the motor flange 260, corresponding bores defined in the endplate 124a and are threaded into threaded bores in the backing plate 128. Removing the four bolts 258, allows the hydraulic motor 252 to be withdrawn from engagement with the splines 154 of the axle 146. This frees the motor end of the axle 146.

The opposite end of the axle 146 is held in place by the bearing 132. See FIG. 2. The bearing 132 is in turn held in place on the endplate 124b by two bolts 264 that are passed through bores in the endplate 124b and are threaded into bores defined in the backing plate 134. Removal of the three bolts 264 permits removal of the bearing 132, Partially freeing the second end of the drum assembly 64. A third bolt, bolt 266 is threaded into an blind axial bore defined in the axle 146. A large washer 267 is interposed between the head of the bolt 266 and the axle 146 Once the bolts 264, 266 are removed, the drum assembly 64 if then free to be dropped clear of the two endplates 124a, 124b.

It will be obvious to those skilled in the art that other embodiments in addition to the ones described herein are indicated to be within the scope and breadth of the present application. Accordingly, the applicant intends to be limited only by the claims appended hereto.

What is claimed is:

1. A soil conditioner implement designed for operation in cooperation with a supporting skid steer vehicle, the skid steer vehicle being moveable over soil to be conditioned, the soil having an upper surface, and the vehicle having a source of hydraulic fluid under pressure for transmission to the soil conditioner implement for powering thereof and having a skid steer control system for providing a plurality of commands to the soil conditioner implement, the soil conditioner implement comprising:

a drum member having a rotatable drum, the drum being selectively contactable with the soil to be conditioned; and a bolster member operably coupled to the drum member for selectively supporting in part the drum member, the bolster member being shiftable between a soil engaging disposition and a flipped-up disposition, the bolster member being supported on the drum member when the bolster member is arranged in the flipped-up disposition such that the bolster member is spaced above the soil upper surface while the drum is in contact with the soil.

2. The soil conditioner implement of claim 1 wherein a length dimension is substantially reduced by shifting the bolster member from the soil engaging disposition to the flipped-up disposition.

3. The soil conditioner implement of claim 1 wherein the drum member is the forwardmost implement component in a lengthwise dimension when the bolster member is in the flipped-up disposition.

4. The soil conditioner implement of claim 1 wherein the drum member may be advanced for soil conditioning operations proximate an object when the bolster member is in the flipped-up disposition.

5. The soil conditioner implement of claim 1 wherein operation of the soil conditioner implement in a reverse direction when the bolster member is in the flipped-up disposition acts to impart a conditioned appearance to the soil that is free of wheel imprints.

6. The soil conditioner implement of claim 1 wherein the bolster member includes a beam axle supporting a pair of selectively ground engaging wheels, the axle being free to oscillate in a plane that is oriented substantially orthogonal to a bolster longitudinal axis.

7. The soil conditioner implement of claim 6 wherein the height of the bolster member wheels relative to the drum is adjustable at a single point.

8. The soil conditioner implement of claim 7 wherein decoupling the bolster member adjusting link from the drum member frees the bolster member for shifting between the soil engaging disposition and the flipped-up disposition.

9. The soil conditioner implement of claim 8 wherein the plurality of teeth are disposed on the drum of the drum member in a plurality of longitudinal rows, certain rows of the plurality of rows having a corresponding identical row and certain other rows of the plurality of rows being fee of a corresponding identical row.

10. The soil conditioner implement of claim 6 wherein the bolster member is operably coupled to the drum member in part by means of an adjusting link, the adjusting link having a selective length dimension, the length dimension effecting the height of the bolster member wheels relative to the drum.

11. The soil conditioner implement of claim 1 wherein the drum of the drum member has a plurality of outward directed teeth disposed thereon, the teeth defining a crisscrossing pattern when viewed in a radial dimension of the drum.

12. The soil conditioner implement of claim 11 wherein the plurality of teeth are disposed on the drum of the drum member in ten longitudinal rows, four of the rows having a corresponding identical row and two of the rows being free of a corresponding identical row.

13. The soil conditioner implement of claim 12 wherein the shell is symmetrical with respect to a shell longitudinal dimension, the symmetry resulting in the shell being reversible on the axle.

14. The soil conditioner implement of claim 1 wherein the drum of the drum member has an axle and a substantially cylindrical shell, the axle including drive components and being centrally disposable with respect to the shell and being readily removable from the shell.

15. The soil conditioner implement of claim 1 wherein the drum of the drum member is rotatably powered by a motor, the motor being operably coupled to the drum in a direct drive configuration.

16. The soil conditioner implement of claim 15 further including a first selectively installable guard being operably coupled proximate a first end of the drum of the drum member and a second selectively installable guard being operably coupled proximate a second end of the drum of the drum member, the first and second guards being projectable only forward of the drum.

17. The soil conditioner implement of claim 1 further including at least one selectively installable guard being operably coupled proximate an end of the drum of the drum member and being projectable only forward of the drum.

18. The soil conditioner implement of claim 1 further including at least one deflector being mounted to the drum member in a fixed disposition generally above the drum and extending substantially coextensive with a drum longitudinal dimension.

19. The soil conditioner implement of claim 1 further including a first deflector being mounted to the drum member in a fixed disposition generally above the drum and extending substantially coextensive with the drum longitudinal dimension and a second deflector being mounted to the drum member in a fixed disposition generally above the drum and extending substantially coextensive with the drum longitudinal dimension, the second deflector being spaced apart from and rearwardly disposed relative to the first deflector.

20. The soil conditioner implement of claim 19 further including a locking member, the locking member being selectively lockingly engagable with both the float assembly and the back plate, the locking engagement of the locking member acting to restrain the float of the float assembly relative to the back plate.

21. The soil conditioner implement of claim 1 further including a float assembly being operably shiftably coupled to the drum member and being operably shiftably coupled to a back plate, the float assembly being selectively floatable relative to the back plate about a float axis that is substantially orthogonally disposed relative to an implement longitudinal axis.

22. The soil conditioner implement of claim 20 wherein the drum assembly is selectively shiftable relative to the float assembly about an axis that is orthogonally disposed with respect to both the implement longitudinal axis and the float axis.

23. The soil conditioner implement of claim 20 wherein tilting the back plate when the bolster member is in the soil engaging disposition acts to selectively raise or lower the drum relative to the soil to be conditioned.

24. The soil conditioner implement of claim 23 wherein the valve is fluidly coupled to a motor, the motor being directly coupled to the drum for imparting rotational motion to the drum.

25. The soil conditioner implement of claim 24 wherein fluid flow through is reversible without affecting a valve configuration, the flow reversal effecting a reversal of a motor direction of rotation resulting in reversal of the rotational motion of the drum.

26. The soil conditioner implement of claim 1 further including a hydraulic system, the hydraulic system being couplable to the skid steer source of hydraulic fluid under pressure and to the skid steer control system, the hydraulic system having a processor, the processor being in communication with a valve, the processor providing suitable commands to configure the valve to effect operation of selected soil conditioner components.

27. The soil conditioner implement of claim 24 wherein the valve is fluidly coupled to a hydraulic cylinder, the hydraulic cylinder being coupled to the drum member for imparting rotational motion to the drum member about a substantially vertical axis to advance a first end of the drum relative to a second end of the drum.

28. The soil conditioner implement of claim 27 wherein the valve is configurable responsive to a command from the processor to reverse a flow of hydraulic fluid to the hydraulic cylinder, the reversal effecting a reversal of the drum member direction of rotation.

29. A soil conditioner implement designed for operation in cooperation with a supporting skid steer vehicle, the skid steer vehicle being moveable over the soil to be conditioned and having a source of hydraulic fluid under pressure for transmission to the soil conditioner implement for powering thereof and having a skid steer control system for providing a plurality of commands to the soil conditioner implement, the soil conditioner implement comprising:

a drum member being operably coupled to and supported at least in part by a back plate, the back plate being couplable to the skid steer vehicle, the drum member being firther operably coupled to a bolster member and being selectively supported by the back plate in cooperation with the bolster member.

30. The soil conditioner of claim 29 wherein the bolster member is shiftable between a soil engaging disposition and a flipped-up disposition, the bolster member being borne on the drum member when in the flipped-up disposition.

31. The soil conditioner implement of claim 30 wherein a length dimension is substantially reduced by shifting the bolster member from the soil engaging disposition to the flipped-up disposition.

32. The soil conditioner implement of claim 30 wherein the drum member is the forwardmost implement component in a lengthwise dimension when the bolster member is in the flipped-up disposition.

33. The soil conditioner implement of claim 30 wherein the drum member may be advanced for conducting soil conditioning operations proximate an object when the bolster member is in the flipped-up disposition.

34. The soil conditioner implement of claim 30 wherein operation of the soil conditioner implement in a reverse direction when the bolster member is in the flipped-up disposition acts to impart a conditioned appearance to the soil that is free of wheel imprints.

35. The soil conditioner implement of claim 29 wherein the bolster member includes a beam axle supporting a pair of selectively ground engaging wheels, the axle being free to oscillate in a plane that is oriented substantially orthogonal to a bolster longitudinal axis.

36. The soil conditioner implement of claim 35 wherein the height of the bolster member wheels relative to the drum is adjustable at a single point.

37. The soil conditioner implement of claim 36 wherein decoupling the bolster member adjusting link from the drum member frees the bolster member for shifting between the soil engaging disposition and the flipped-up disposition.

38. The soil conditioner implement of claim 37 wherein the plurality of teeth are disposed on the drum of the drum member in a plurality of longitudinal rows, certain rows of the plurality of rows having a corresponding identical row and certain other rows of the plurality of rows being fee of a corresponding identical row.

39. The soil conditioner implement of claim 35 wherein the bolster member is operably coupled to the drum member in part by means of an adjusting link, the adjusting link having a selective length dimension, the length dimension effecting the height of the bolster member wheels relative to the drum.

40. The soil conditioner implement of claim 29 wherein the drum of the drum member has a plurality of outward directed teeth disposed thereon, the teeth defining a crisscrossing pattern when viewed in a radial dimension of the drum.

41. The soil conditioner implement of claim 39 wherein the plurality of teeth are disposed on the drum of the drum member in ten longitudinal rows, four of the rows having a corresponding identical row and two of the rows being free of a corresponding identical row.

42. The soil conditioner implement of claim 41 wherein the shell is symmetrical with respect to a shell longitudinal dimension, the symmetry resulting in the shell being reversible on the axle.

43. The soil conditioner implement of claim 29 wherein the drum of the drum member has an axle and a substantially cylindrical shell, the axle including drive components and being centrally disposable with respect to the shell and being readily removable from the shell.

44. The soil conditioner implement of claim 29 wherein the drum of the drum member is rotatably powered by a motor, the motor being operably coupled to the drum in a direct drive configuration.

45. The soil conditioner implement of claim 44 further including a first selectively installable guard being operably coupled proximate a first end of the drum of the drum member and a second selectively installable guard being operably coupled proximate a second end of the drum of the drum member, the first and second guards being projectable only forward of the drum.

46. The soil conditioner implement of claim 29 further including at least one selectively installable guard being operably coupled proximate an end of the drum of the drum member and being projectable only forward of the drum.

47. The soil conditioner implement of claim 29 further including at least one deflector being mounted to the drum member in a fixed disposition generally above the drum and extending substantially coextensive with a drum longitudinal dimension.

48. The soil conditioner implement of claim 29 further including a first deflector being mounted to the drum member in a fixed disposition generally above the drum and extending substantially coextensive with the drum longitudinal dimension and a second deflector being mounted to the drum member in a fixed disposition generally above the drum and extending substantially coextensive with the drum longitudinal dimension, the second deflector being spaced apart from and rearwardly disposed relative to the first deflector.

49. The soil conditioner implement of claim 48 further including a locking member, the locking member being selectively lockingly engagable with both the float assembly and the back plate, the locking engagement of the locking member acting to restrain the float of the float assembly relative to the back plate.

50. The soil conditioner implement of claim 49 wherein the locking member is selectively engagable the back plate when in a float engagement, the float engagement of the locking member acting to limit the downward inclination of the float assembly relative to the back plate.

51. The soil conditioner implement of claim 29 further including a float assembly being operably shiftably coupled to the drum member and being operably shiftably coupled to a back plate, the float assembly being selectively floatable relative to the back plate about a float axis that is substantially orthogonally disposed relative to an implement longitudinal axis.

52. The soil conditioner implement of claim 49 wherein the drum assembly is selectively shiftable relative to the float assembly about an axis that is orthogonally disposed with respect to both the implement longitudinal axis and the float axis.

53. The soil conditioner implement of claim 49 wherein tilting the back plate when the bolster member is in the soil engaging disposition acts to selectively raise or lower the drum relative to the soil to be conditioned.

54. The soil conditioner implement of claim 53 wherein the valve is fluidly coupled to a motor, the motor being directly coupled to the drum for imparting rotational motion to the drum.

55. The soil conditioner implement of claim 54 wherein hydraulic flow through the valve reversible without effecting a valve configuration change, the flow reversal effecting a reversal of a motor direction of rotation resulting in reversal of the rotational motion of the drum.

56. The soil conditioner implement of claim 29 further including a hydraulic system, the hydraulic system being couplable to the skid steer source of hydraulic fluid under pressure and to the skid steer control system, the hydraulic system having a processor, the processor being in communication with a valve, the processor providing suitable commands to configure the valve to effect operation of selected soil conditioner components.

57. The soil conditioner implement of claim 54 wherein the valve is fluidly coupled to a hydraulic cylinder, the hydraulic cylinder being coupled to the drum member for imparting rotational motion to the drum member about a substantially vertical axis to advance a first end of the drum relative to a second end of the drum.

58. The soil conditioner implement of claim 57 wherein the valve is configurable responsive to a command from the processor to reverse a flow of hydraulic fluid to the hydraulic cylinder, the reversal effecting a reversal of the drum member direction of rotation.

59. A method of conditioning soil having the following steps:

imparting rotational motion to a drum;

bringing the drum into contact with the soil to be conditioned;

selectively freeing the drum to float relative to a supporting back plate and fixing the drum relative to the supporting back plate, and controlling a depth of the drum relative to the soil to be conditioned with a bolster assembly.

60. The method of claim 59 including the step of supporting the drum in part by a leading bolster member.

61. The method of claim 60 including the step of shifting the bolster member from a leading soil engaging disposition to a flipped up disposition wherein the drum is leading.

62. The method of claim 61 including the step of advancing the drum proximate an object to effect soil conditioning when the bolster member is in the flipped up disposition.

63. The method of claim 61 including the step of adjusting the elevation of the drum relative to the soil being conditioned when the bolster member is in the leading soil engaging disposition by tilting the supporting back plate.

64. The method of claim 60 including the step of adjusting the height of the bolster member relative to the drum at a single point.

65. The method of claim 60 including the step of oscillating the bolster member about a longitudinal axis responsive to changes in elevation of the soil being conditioned.

* * * * *

UNITED STATES PATENT AND TRADEMARK OFFICE
CERTIFICATE OF CORRECTION

PATENT NO. : 6,497,294 B2
DATED : December 24, 2002
INVENTOR(S) : Michael L. Vought It is certified that error appears in the above-identified patent and that said Letters Patent is hereby corrected as shown below:

Column 15,
Line 27, "the plurality of rows being fee" should be -- the plurality of rows being free --

Column 17,
Line 50, "the plurality of rows being fee" should be -- the plurality of rows being free --

Column 19,
Line 18, "The soil conditioner implement of claim 54" should be -- The soil conditioner implement of claim 56 --

Signed and Sealed this

First Day of July, 2003

JAMES E. ROGAN
*Director of the United States Patent and Trademark Office*